Patented Oct. 4, 1932

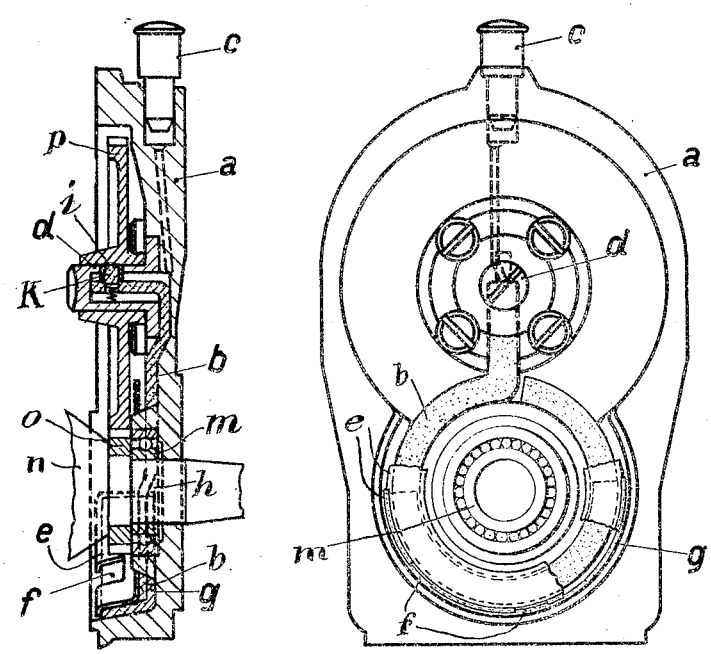

1,880,334

UNITED STATES PATENT OFFICE

GOTTLIEB STEINER, OF SOLOTHURN, SWITZERLAND, ASSIGNOR TO SCINTILLA, AKTIEN-GESELLSCHAFT, OF SOLOTHURN, SWITZERLAND

LUBRICATING DEVICE

Application filed July 6, 1927, Serial No. 203,854, and in Switzerland May 6, 1927.

It has already been proposed to lubricate magneto-electric ignition apparatus with the aid of strips or pieces of felt, which are capable of taking up a considerable quantity of the lubricant, and parting with it gradually. This provides for substantially continuous lubrication, but with such a lubricating system it is necessary to add oil after a certain period of running.

The chief part to be lubricated in a magneto-electric ignition apparatus is without doubt the shaft of the distributor gear wheel. The distributor gear wheel runs at a very high speed of revolution and its shaft must be continuously lubricated. The various devices for continuous lubrication at this place, which have been hitherto proposed, all have the drawback, as already stated, that after a number of running hours the lubricant must be replenished.

The present invention has for its object to overcome this drawback and consists more particularly in this that the felt strip is mounted around the ball bearing of the front end plate for the rotating magnet and extends into the distributor gear axle allowing the oil, by means of a radial hole in the gear axle, to flow out on to the bearing surface of same. The oil thrown off the distributor gears by centrifugal force is caught by the felt strip, and returned to the place to be lubricated. By this means an actually automatic continuous lubrication is obtained and the apparatus does not require any further lubrication during the whole time it is running. The felt strip thus forms as it were a reservoir from which the lubricating oil is taken and to which it is returned in a closed circuit.

In the accompanying drawing an internal view of the front end plate $a$ of an ignition apparatus with gear wheels and retaining plate removed is shown in Figure 1 by way of example and a view in longitudinal section in Figure 2. The bearing portion $h$ of the front end plate holds the ball race for the drive end bearing $m$ of the rotating magnet $n$ and around this bearing portion is the felt strip $b$, the upper end of which goes into the hollow gear axle $d$ which has a radial hole $i$ with a spring loaded felt strip $k$. On this axle is mounted the distributor gear $p$ which is driven by the gear $o$ keyed on to the rotating magnet. In order that large quantities of oil may be absorbed the lower round portion of the felt strip consists of a number of layers of strips, shown in the drawing as example by one strip $g$. For holding the lower round portion of the felt strip in position it is surrounded by a metal ring $e$ which is provided with slots $f$. A single supply of oil in the oil cup $c$ of the front end plate completely saturates the felt strip $b$. By capillary attraction of the felt strip $b$ the lubricant is sucked up into the hollow gear axle $d$ and through the felt strip $k$ on to the bearing surface $l$ of the gear axle $d$. Through the high speed of revolution a large proportion of the oil is always thrown off by centrifugal action and collects in the lowest part of the front end plate where oil from the various ball bearings also collects flowing through the slots $f$ into the felt. The construction of the example shown in the drawing is such that the lower part of the felt strip is just where the oil collects.

Having now described my invention, what I claim as new and desire to secure by Letters Patent is:—

In a magneto-electric ignition apparatus, an end plate for said apparatus supporting a stub shaft for a distributor gear, a lubricating device for the stub shaft comprising a felt strip impregnated with lubricant, the upper part of said strip being arranged in said stub shaft for lubricating its bearing surface and the lower part of said strip being in the lower part of said housing where excess oil collects, and a slotted retaining plate for holding said felt strip within the end plate.

In testimony whereof I have signed my name to this specification.

GOTTLIEB STEINER.